(12) United States Patent
Koumura et al.

(10) Patent No.: US 6,356,046 B1
(45) Date of Patent: Mar. 12, 2002

(54) INSTRUMENT PANEL HAVING POINTER DRIVEN BY STEPPING MOTOR

(75) Inventors: Takashi Koumura, Toyota; Hideki Asano, Nisshin, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/689,772

(22) Filed: Oct. 13, 2000

(30) Foreign Application Priority Data

Oct. 27, 1999 (JP) .......................................... 11-305817
Mar. 10, 2000 (JP) .......................................... 12-072497

(51) Int. Cl.⁷ .......................... G01R 1/20; H02K 37/12
(52) U.S. Cl. ...................... 318/696; 116/62.1; 116/300; 116/305
(58) Field of Search ........................ 318/696; 310/49 R; 116/28 R, 46, 47, 48, 49, 62.1, 200, 284, 300, 305, DIG. 6, DIG. 35, DIG. 36; 33/1 L, 300, 501, 600

(56) References Cited

U.S. PATENT DOCUMENTS

| | | | | |
|---|---|---|---|---|
| 5,062,135 A | * | 10/1991 | Ohike | ..................... 324/154 R |
| 5,223,791 A | * | 6/1993 | Umehara | ..................... 324/146 |
| 5,319,527 A | * | 6/1994 | Murphy et al. | ................. 362/26 |
| 5,546,888 A | * | 8/1996 | Skiver et al. | ................. 116/286 |
| 5,582,129 A | * | 12/1996 | Furuya | ..................... 116/284 |
| 5,734,210 A | | 3/1998 | Keutz | ..................... 310/49 R |
| 6,043,574 A | | 3/2000 | Prudham | ..................... 310/49 R |
| 6,211,585 B1 | * | 4/2001 | Sato et al. | ................. 310/49 R |

FOREIGN PATENT DOCUMENTS

JP        9-21655        1/1997

* cited by examiner

*Primary Examiner*—Bentsu Ro
(74) *Attorney, Agent, or Firm*—Pillsbury Winthrop LLP (57) ABSTRACT

An instrument panel for use in an automobile includes a speedometer, an engine rotational speed meter and other indicators. A pointer of each meter is driven by a stepping motor via a reduction gear train made of synthetic resin. Terminals of the stepping motor field coils are soldered on a circuit board. After the heat of the soldering is dissipated, the heat-sensitive gear train is assembled to the circuit board. Thus, the resin gears are protected from being damaged by the soldering heat. The soldering is performed under an automatic refolw-soldering or flow-soldering process. As long as the soldering is performed before assembling the resin gears, all the components of the stepping motor and the reduction gear train may be contained in a casing.

10 Claims, 6 Drawing Sheets

INSTRUMENT PANEL HAVING POINTER DRIVEN BY STEPPING MOTOR

CROSS-REFERENCE TO RELATED APPLICATIONS

This application is based upon and claims benefit of priority of Japanese Patent Applications No. Hei-11-305817 filed on Oct. 27, 1999 and No. 2000-72497 filed on Mar. 10, 2000, the contents of which are incorporated herein by reference.

BACKGROUND OF THE INVENTION

1. Field of the Invention

The present invention relates to an instrument panel having a pointer driven by a motor for use in an automobile vehicle or other devices.

2. Description of Related Art

An example of this kind of instrument panel is disclosed in JP-A-9-21655. In the instrument panel disclosed therein, a device for driving a pointer is installed behind a printed circuit board and electrically connected to the circuit board by soldering. Another example is shown in JPA-8-233611. The instrument panel shown therein includes a stepping motor for driving a pointer via a reduction gear train. Gears constituting the reduction gear train are made of synthetic resin to suppress gear noises and to reduce the weight.

The gears made of synthetic resin, however, are weak against the heat that is generated in a soldering process such as flow-soldering or reflow-soldering. The gears tend to be damaged by the heat in the soldering-process.

SUMMARY OF THE INVENTION

The present invention has been made in view of the above-mentioned problem, and an object of the present invention is to provide an improved instrument panel which is easily manufactured without causing damages on heat-sensitive components by the soldering heat.

An instrument panel such as a combination meter for use in an automotive vehicle includes one or more pointers driven by a motor such as a stepping motor. The instrument panel is composed of a front panel having scales and numerals printed thereon, a rotatable pointer, a stepping motor for driving the pointer, a reduction gear train disposed between the pointer and the motor to reduce the rotational angle of the motor, and a circuit board for electrically connecting a field coil of the motor and other components. The circuit board is positioned behind the front panel forming a certain space therebetween. The reduction gear train includes plural gears made of synthetic resin which is weak and sensitive to heat. Terminals of the field coil are soldered on the circuit board under a reflow-soldering or flow-soldering process.

To protect the heat-sensitive resin gears from heat of soldering, components such as the field coil are first supported on the circuit board and soldered thereon. After cooling down the heat of soldering, the reduction gear train having heat-sensitive resin gears is mounted on the circuit board. A stator of the motor having the field coil may be placed at the front side of the circuit board, and a rotor of the motor and the reduction gear train may be placed at the rear side. An entire motor including its rotor may be placed at the front side of the circuit board, and only the reduction gear train may be placed at the rear side.

Alternatively, an entire driver device including the motor and the reduction gear train may be positioned at the rear side of the circuit board, as long as the field coil is soldered on the circuit board first and then the reduction gear train is mounted on the circuit board after the soldering heat is dissipated. In this structure, a wide space is available at the front side of the circuit board. Accordingly, other components such as an illuminating light source are easily disposed at the front side.

A light-conductive plate having a cutout opening may be attached to the rear surface of the front panel. In this case, the components such as the stator placed at the front side of the circuit board can be positioned in the cutout opening to reduce the thickness of the instrument panel.

The heat-sensitive resin gears are protected against the soldering heat according to the present invention. Further, an automatic reflow- or flow-soldering process can be used to reduce the manufacturing cost.

Other objects and features of the present invention will become more readily apparent from a better understanding of the preferred embodiments described below with reference to the following drawings.

DETAILED DESCRIPTION OF THE PREFERRED EMBODIMENTS

Figure 1:
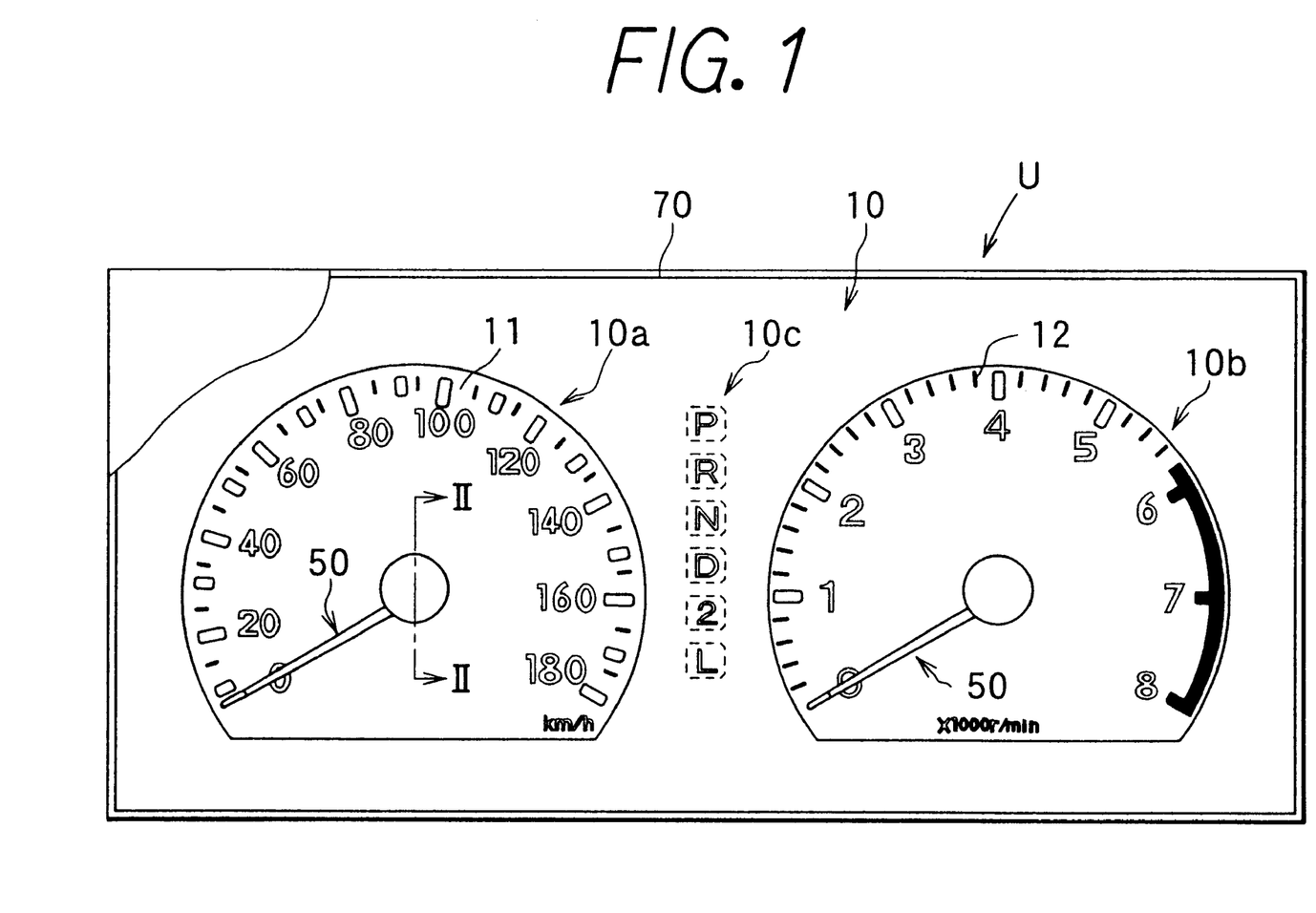
FIG. 1 is a front view showing an instrument panel for use in an automobile vehicle.

A first embodiment of the present invention will be described with reference to FIGS. 1 to 3. FIG. 1 shows a front view of an instrument panel for use in an automobile as a combination meter. The instrument panel U has a front panel 10 on which a scale plate 10a for showing a vehicle speed (a speedometer) and another scale plate 10b for showing an engine rotational speed (an engine rotation meter) are disposed. On each scale plate 10a, 10b, an arc-shaped transparent portion 11, 12 having scales and numerals is formed. The vehicle speed and the engine rotational speed are indicated by respective pointers 50. Each pointer is driven by a respective stepping motor installed behind the front panel 10. The front panel 10 also includes an indicator portion 10c that shows gear positions of an automatic transmission. A fringe plate 70 is disposed on the periphery of the front panel 10.

Figure 2:
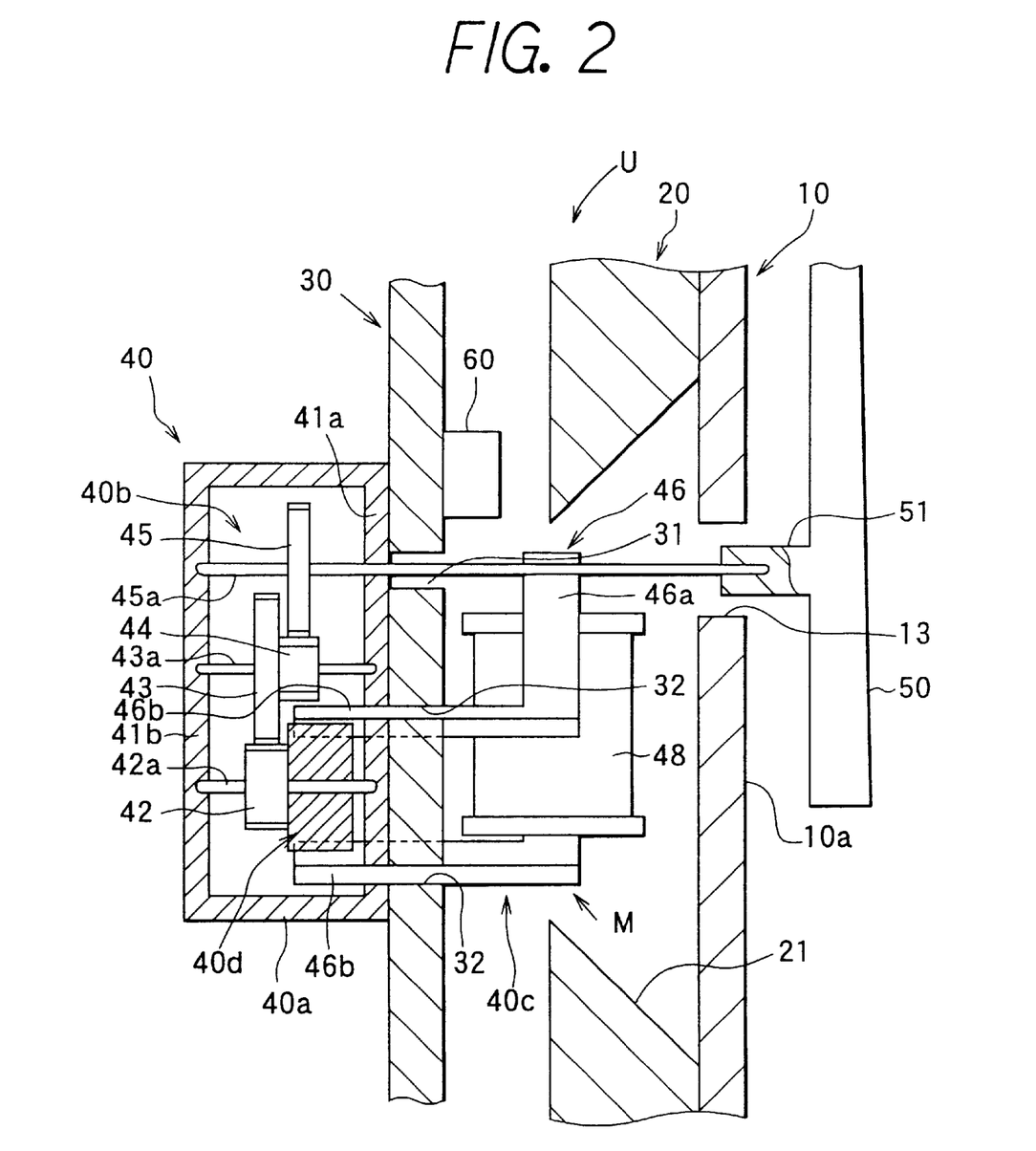
FIG. 2 is a cross-sectional view showing an instrument panel as a first embodiment of the present an. invention, taken along line II—II in FIG. 1.

Referring to FIG. 2, which is a cross-sectional view of the instrument panel, taken along line II—II in FIG. 1, the structure of the instrument panel will be described. Since the structure of the speedometer (a left side meter in FIG. 1) and that of the engine rotation meter (a right side meter in FIG. 1) are substantially the same, the structure of the speedometer will be described below as a representative of both meters. A light-conductive plate 20 made of transparent acrylic resin, polycarbonate resin or the like is attached to the rear surface of the front panel 10. An opening 21 facing a vicinity of a through-hole 13 through which a pointer shaft 45a for driving the pointer 50 extends is formed in the light-conductive plate 20. A reflection film is formed on the rear surface of the light-conductive plate 20. Behind the light-conductive plate 20, a printed circuit board 30 is disposed. A casing 40a containing most parts of a driver device 40 for driving the pointer 50 is fixed to the rear surface of the circuit board 30.

Now, the driver device 40 will be described in detail with reference to FIGS. 2 and 3. The casing 40a includes a first wall 41a attached to the rear surface of the circuit board 30 and a second wall 41b opposite to the first wall 41a. The driver device 40 includes a stepping motor M and a reduction gear train 40b. The stepping motor M is composed of a rotor 40d made of a magnet and a stator 40c. The reduction gear train 40b and the rotor 40d are contained in the casing 40a, while the stator 40c is disposed in a space between the front panel 10 and the circuit board 30.

The reduction gear train 40b is composed of four spur gears 42–45. The gear 42 is connected to the rotor 40d and fixed to a gear shaft 42a that is rotatably supported between the first and second walls 41a, 41b. The spur gear 43 engaging with the gear 42 is fixed to a gear shaft 43a together with the gear 44, and the gear shaft 43a is rotatably supported between the first and second walls 41a, 41b. The spur gear 45 engaging with the gear 44 is fixed to a pointer shaft 45a that is rotatably supported between the first and second walls 41a, 41b.

The pointer shaft 45a further extends toward the front surface of the instrument panel through a through-hole 31 formed in the circuit board 30 and a through-hole 13 formed in the front panel 10. The pointer shaft 45a is connected to the pointer 50 at a boss 51 of the pointer 50. The diameter of the gear 43 is larger than those of the gears 42 and 44, and the diameter of the gear 45 is larger than that of the gear 44. A rotational angle of the rotor 40d is reduced through the reduction gear train 40b, and the pointer 50 is rotated with the reduced angle. All the gears 42–45 are made of synthetic resin (e.g., soft resin) to suppress gear noises generated by rotational engagement among gears.

Figure 3:
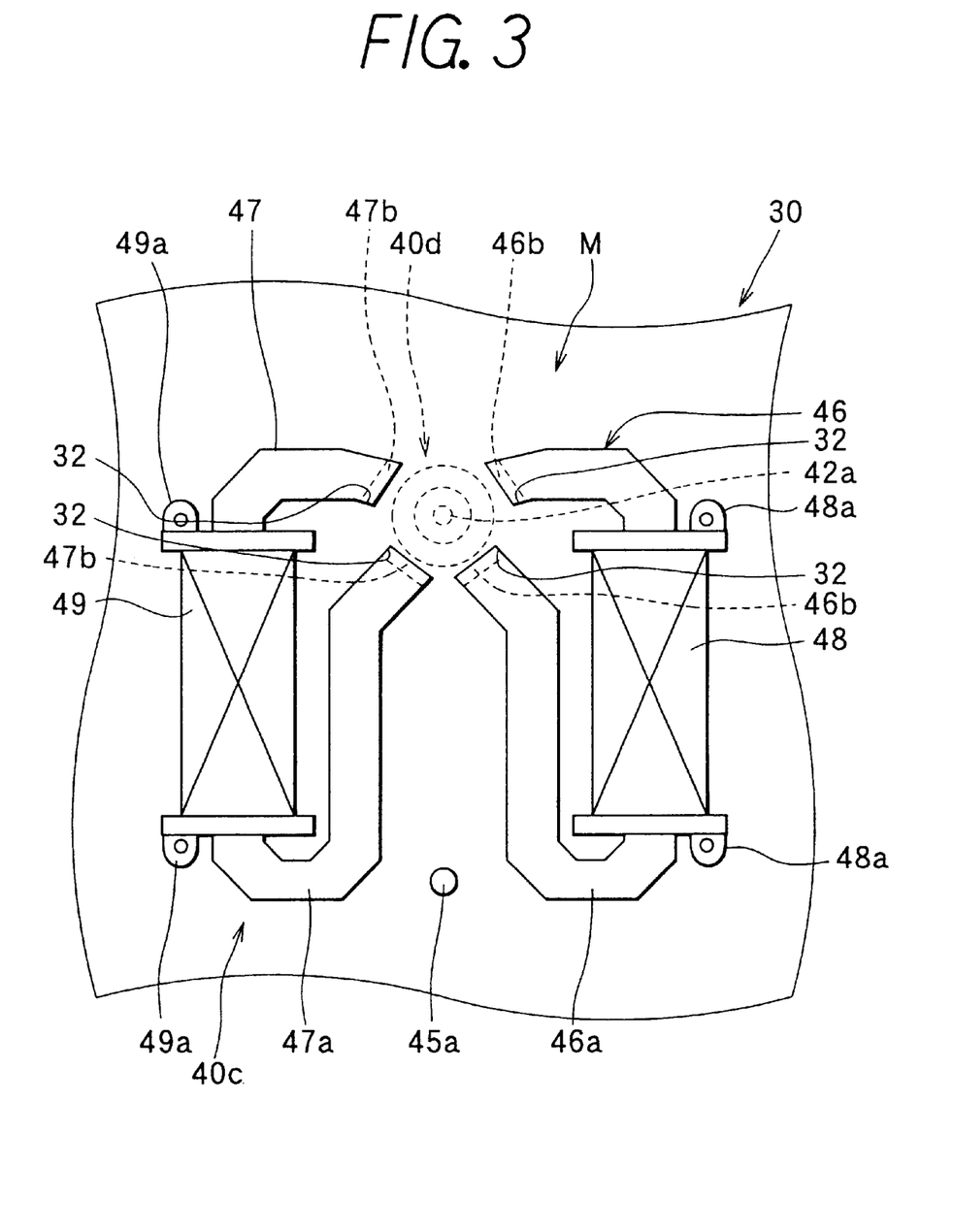
FIG. 3 is a plan view showing a stepping motor used in the instrument panel shown in FIG. 2.

The stepping motor M, as shown in FIGS. 2 and 3, consists of the rotor 40d disposed in the casing 40a and the stator 40c disposed in the space between the circuit board 30 and the front panel 10. The stator 40c is composed of a pair of yokes 46, 47 mounted on the circuit board 30 and a pair of field coils 48, 49 wound around the yokes, as better seen in FIG. 3. The yoke 46 has a U-shaped yoke body 46a and a pair of poles 46b bent from the end portions of the yoke body. Similarly, the yoke 47 has a U-shaped yoke body 47a and a pair of poles 47b bent from the end portions of the yoke body. Both yokes 46, 47 are placed symmetrically to each other with respect to a line connecting the gear shaft 42a and the pointer shaft 45a, as shown in FIG. 3. Both yoke bodies 46a, 47a having field coils 48, 49 are positioned in the space between the circuit board 30 and the front panel 10 so that they are partly accommodated in the opening 21 of the light-conductive plate 20, as shown in FIG. 2. The poles 46b, 47b of the respective yokes 46, 47 extend into the inner space of the casing 40a through through-holes 32 formed in the circuit. board 30, so that the poles 46b, 47b face the rotor 40d disposed in the casing 40a with air gaps therebetween.

A pair of terminals 48a of the field coil 48 and a pair of terminals 49a of the field coil 49 are respectively soldered on terminals formed on the front surface of the circuit board 30 by reflow-soldering. Electric current is supplied from a power source to both field coils 48, 49 through the soldered terminals on the circuit board 30. A magnetic circuit is formed by both yokes 46, 47 and the rotor 40d, and thereby the rotor 40d is driven. The rotation of the rotor 40d is transferred to the pointer shaft 45a via the reduction gear train 40b. The stepping motor M for driving the speedometer pointer 50 rotates according to the vehicle speed, while the stepping motor M for driving the engine rotation pointer 50 rotates according to the rotational speed of the engine.

A light source 60 for illuminating either the pointer 50 or the scale plate 10a, 10b, or both, is mounted and soldered on the front surface of the circuit board 30, as shown in FIG. 2.

The driver device 40 including the reduction gear train 40b and the stepping motor M is assembled and electrically connected to the circuit board 30 in the following manner. First, the casing 40a containing the reduction gear train 40b and the rotor 40d therein, the stator 40c, and the circuit board 30 having the illuminating light source 60 are separately prepared. Then, poles 46b, 47b bent from the respective yokes 46, 47 are inserted into the through-holes 32 formed in the circuit board 30 thereby to support the yokes 46, 47 along the front surface of the circuit board 30. The field coil terminals 48a, 49a are also inserted into terminal holes formed on the front surface of the circuit board 30. Then, the terminals 48a, 49a are soldered to the circuit board 30 under the reflow-soldering process. Thus, the field coils 48, 49 are electrically connected to the circuit board 30. After the heat generated in the reflow-soldering process is cooled down, the casing 40a is connected to the rear surface of the circuit board 30, so that the pointer shaft 45a extends to the front side through the through-hole 31, and the poles 46b, 47b extends into the inner space of the casing 40a through the through-holes 32 formed in the first wall 41a.

Then, the circuit board 30 is assembled to the light-conductive plate 20 so that the circuit board 30 is supported on the rear surface of the light-conductive plate 20 with a predetermined distance therebetween. The pointer shaft 45a extends to the front side of the front panel 10 through the through-hole 13 formed in the front panel 10. The yoke bodies 46a, 47a having field coils 48, 49 wound therearound are positioned in the opening 21 of the light-conductive plate 20 in the space between the circuit board 30 and the front panel 10. Thus, the driver device 40 and the circuit board 30 are assembled and electrically connected.

Since the casing 40a containing heat-sensitive resin gears therein is connected to the rear surface of the circuit board 30 after the reflow-soldering heat in the circuit board 30 is dissipated, the resin gears are not damaged by the reflow-soldering heat. Therefore, the soldering on the circuit board can be performed under the automatic-reflow process without worrying about damages of the resin gears. Thus, the instrument panel can be manufactured at a low cost. Further, since the stator 40c is positioned in the space within the opening 21 of the light-conductive plate 20, the thickness of the instrument panel can be made smaller. In addition, since the circuit board 30 is commonly used for mounting the light source 60 and for electrically connecting the field coils 48, 49, the structure of the instrument panel is simplified.

Figure 4:
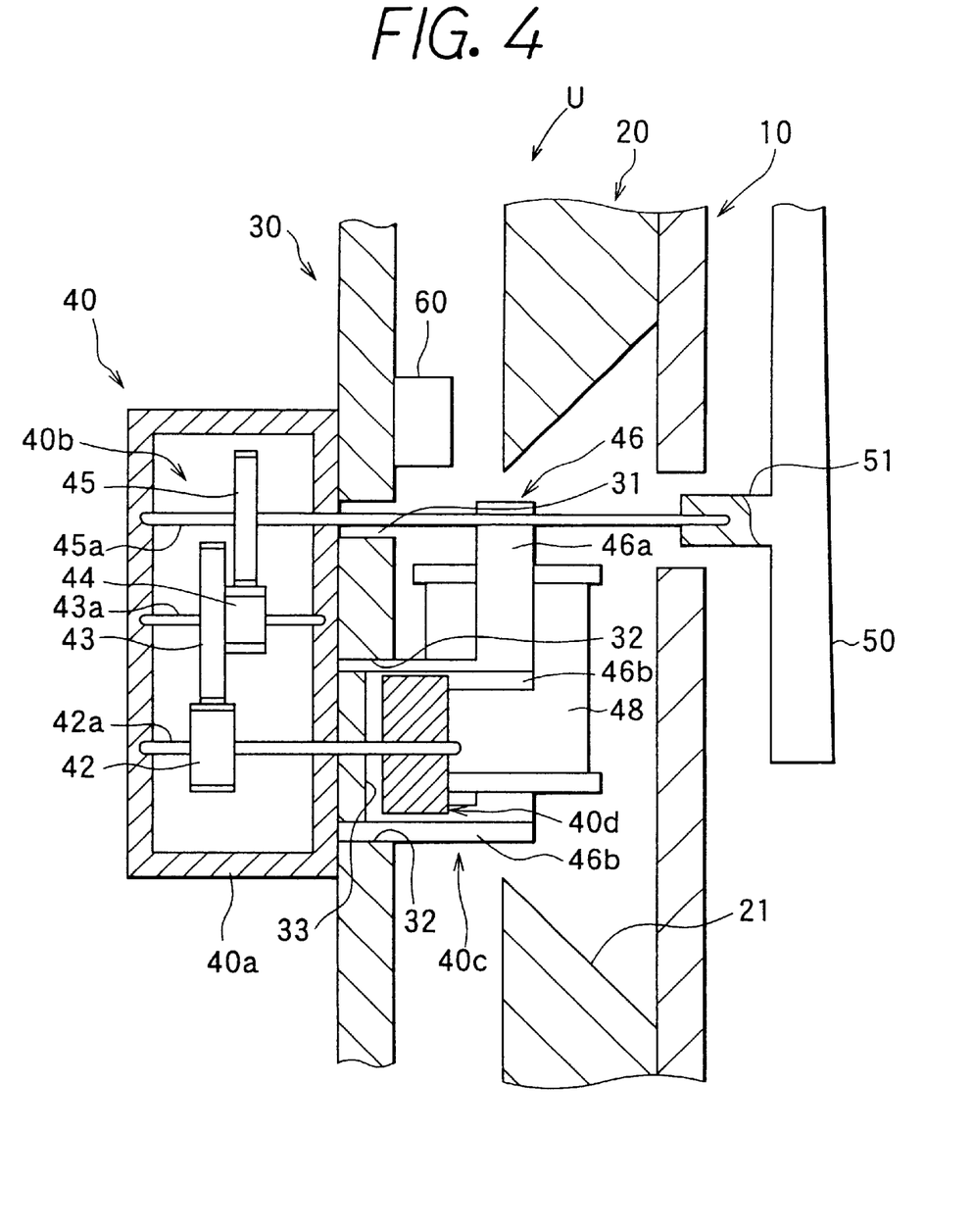
FIG. 4 is a cross-sectional view showing an instrument panel as a second embodiment of the present invention, taken along the similar line as in FIG. 2.

A second embodiment of the present invention will be described with reference to FIG. 4. The second embodiment is the same as the first embodiment except that the rotor 40d is disposed in front of the circuit board 30, not in the casing 40a. The poles 46b, 47b of the yokes 46, 47 need not be extended into the casing 40a. The rotor 40d is positioned in a depressed space 33 in front of the circuit board 30 and is rotatably supported by the gear shaft 42a together with the gear 42.

The circuit board 30 and the driver device 40 are assembled in the similar manner as in the first embodiment. That is, the field coil terminals 48a, 49a are electrically connected to the circuit board 30 under the reflow-soldering process. After the soldering heat is dissipated, the casing 40a containing heat-sensitive resin gears therein is fixed to the rear surface of the circuit board 30. Therefore, the resin gears are not damaged by the soldering heat.

A third embodiment of the present invention will be described with reference to FIGS. 5–8. In this embodiment the driver device 40 of the first embodiment is replaced with a driver device 70. A motor Ma including its rotor 70d and a reduction gear train 70b are all contained in a casing 70a. The driver devices for the speedometer and the engine rotation meter are similarly structured in this embodiment, too. Therefore, the driver device 70 for the speedometer is described as a representative of both driver devices.

Figure 5:
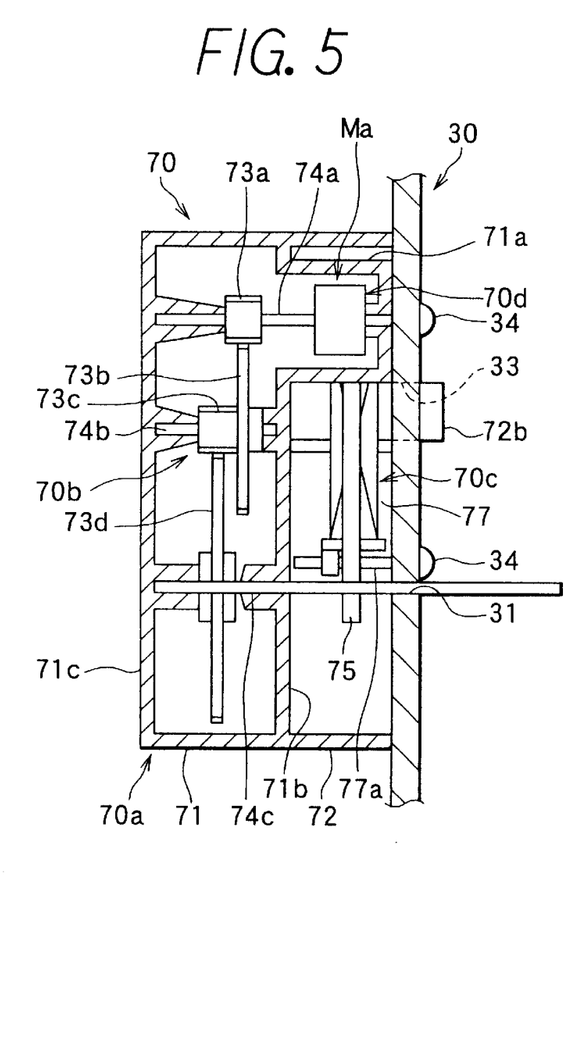
FIG. 5 is a cross-sectional view showing an instrument panel as a third embodiment of the present invention, taken along line V—V in FIG. 6.

The casing 70a containing the driver device 70 therein is connected to the rear surface of the circuit board 30. As shown in FIG. 5, the casing 70a includes an inner wall 71b, a rear wall 71c and a circular wall 72. The circular wall 72 is formed at a position corresponding to the scale plate 10a on the front panel 10. A pair of flexible projections 72b extend from the circular wall 72, which are inserted into engaging holes 33 formed in the circuit board 30 to connect the casing 70a to the circuit board 30. A stator 70c of the stepping motor Ma is disposed in a space confined by the inner wall 71b and the circular wall 72. The reduction gear train 70b is installed in a space between the inner wall 71b and the rear wall 71c. A cylindrical space 71a is also formed in the casing 70a, in which the rotor 70d is disposed.

The reduction gear train 70b is composed of four gears 73a, 73b, 73c and 73d. The gear 73a connected to the rotor 70d is fixed to a gear shaft 74a that is rotatably supported between the rear wall 71c and a bottom wall of the cylindrical space 71a. The gear 73b engaging with the gear 73a and connected to the gear 73c is fixed to a gear shaft 74b that is rotatably supported between the rear wall 71c and the inner wall 71b. The gear 73d engaging with the gear 73c is fixed to a pointer shaft 74c that is rotatably supported between the rear wall 71c and the inner wall 71b. The pointer shaft 74c further extends toward the front panel 10 to be connected to the pointer 50.

The diameter of the gear 73a engaging with the gear 73b is smaller than that of the gear 73b. The diameter of the gear 73c engaging with the gear 73d is smaller than that of the gear 73d. The rotational angle of the motor Ma is transferred to the pointer shaft 74c through the reduction gear train 70b with a predetermined reduction ratio. All the gears 73a–73d are made of synthetic resin that is weak against heat.

Figure 6:
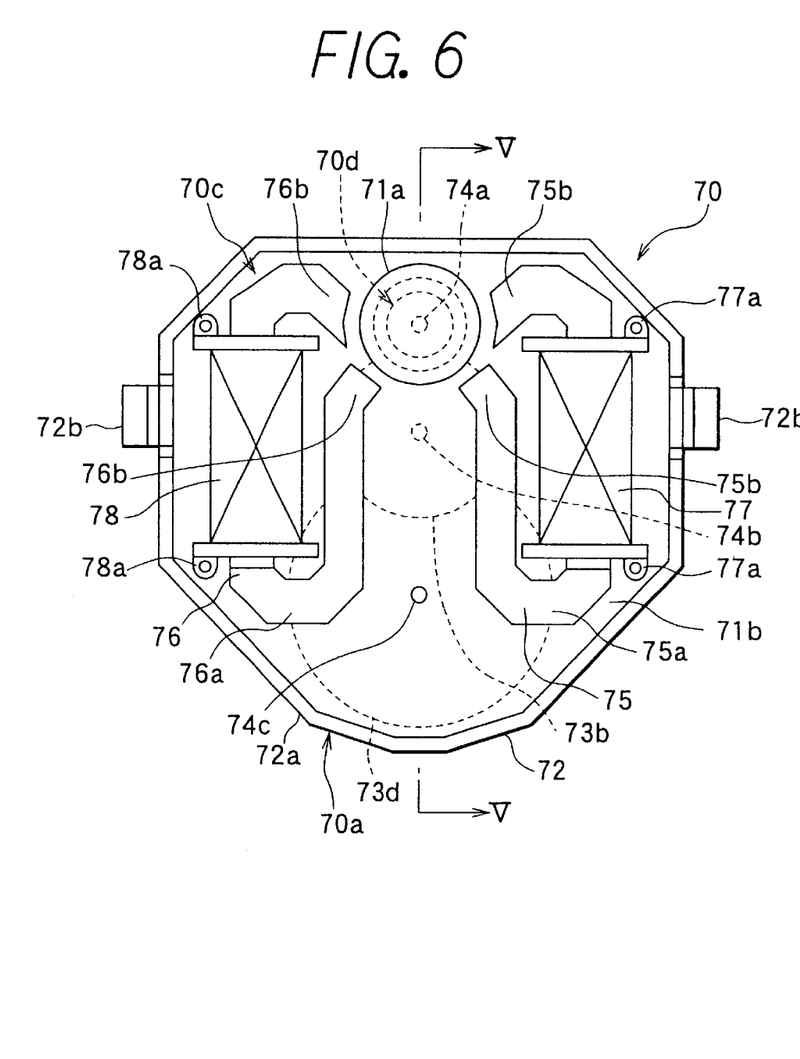
FIG. 6 is a plan view showing a stepping motor used in the instrument panel shown in FIG. 5.

As shown in FIGS. 5 and 6, the stepping motor Ma is composed of a stator 70c and a rotor 70d. The stator 70c is disposed on the circuit board 30 within the circular wall 72, and the rotor 70d is rotatably supported in the cylindrical space 71a.

The stator 70c includes a pair of yokes 75, 76 and field coils 77, 78 wound around the respective yokes, as shown in FIG. 6. The pair of yokes 75, 76 are disposed symmetrically to each other with respect to a line connecting the gear shaft 74a and the pointer shaft 74c, as shown in FIG. 6. The yoke 75 is U-shaped and has a yoke body 75a and poles 75b that face the rotor 70d with an air gap therebetween. Similarly, the yoke 76 is U-shaped and has a yoke body 76a and poles 76b that face the rotor 70d with an air gap therebetween.

A pair of terminal pins 77a connected to the field coil 77 wound around the yoke body 75a are inserted into holes formed in the circuit board 30 (refer to FIG. 8) Similarly, a pair of terminal pins 78a connected to the field coil 78 wound around the yoke body 76a are inserted into holes formed in the circuit board 30. The terminal pins 77a, 78a are soldered to the circuit board 30 under the reflow-soldering process, forming soldered portions 34 on the front surface of the circuit board 30, as shown in FIG. 5.

Electric current is supplied to both field coils 77, 78 from the circuit board 30 through the terminal pins 77a, 78a to generate a magnetic field in a magnetic circuit formed by both yokes 75, 76 and the rotor 70d. The rotor 70d made of a magnet is rotated in the magnetic field generated by the field coils 77, 78. The pointer shaft 74c driven by the motor Ma via the reduction gear train 70b extends to the front surface of the front panel 10 and is connected to the pointer 50, in the same manner as in the first embodiment.

Figure 7:
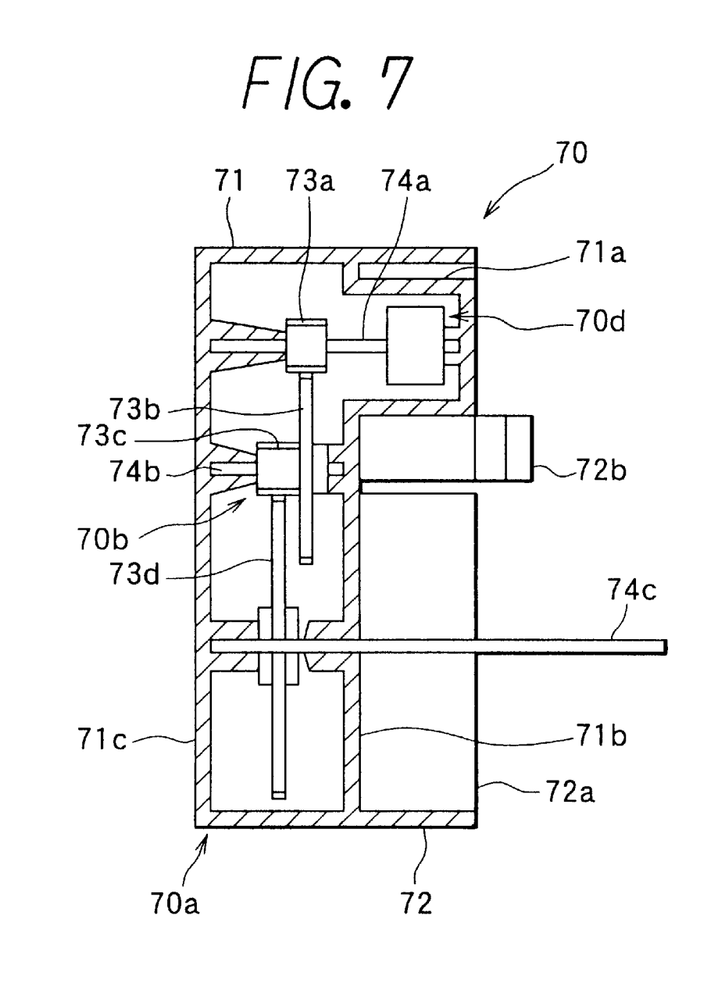
FIG. 7 is a cross-sectional view showing a casing of the third embodiment, in which a reduction gear train and a rotor are contained.
Figure 8:
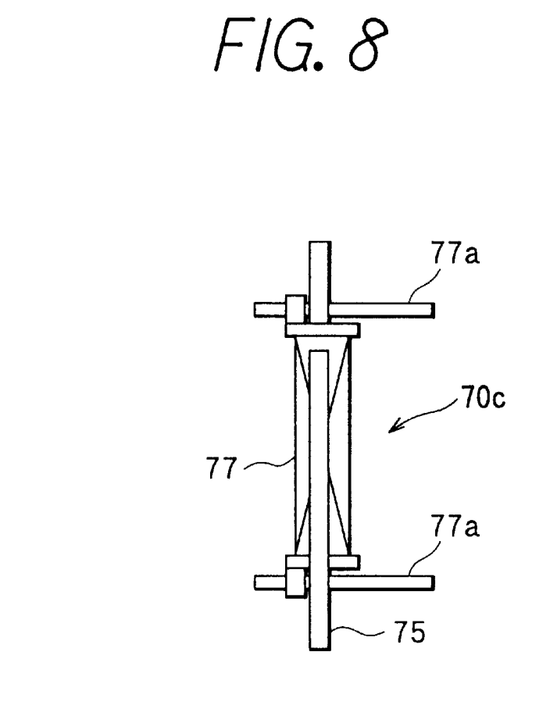
FIG. 8 is a side view showing a stator used in the third embodiment.

Referring to FIGS. 7 and 8, an assembling and soldering process of the driver device 70 will be described. First, the casing 70a in which the reduction gear train 70b and the rotor 70d are installed (as shown in FIG. 7), the stator 70c (as shown in FIG. 8), and the circuit board 30 having the illuminating light source 60 are prepared. Then, the terminal pins 77a, 78a of the stator 70c are inserted into holes formed in the circuit board 30 to support the stator 70c on the rear surface of the circuit board 30. Then, the terminal pins 77a, 78a are electrically connected to the circuit board 30 by reflow-soldering, forming the soldered portions 34 on the front surface of the circuit board 30.

After the heat generated in the reflow-soldering process is dissipated, the circuit board 30 to which the stator 70c is mounted is connected to the casing 70a that contains the reduction gear train 70b and the rotor 70d therein. The pointer shaft 74c extends frontward through the through-hole 31 formed in the circuit board 30, and the poles 75b, 76b of the yokes face the rotor 70d with air gaps therebetween. The casing 70a is mechanically fastened to the circuit board 30 by inserting the flexible projections 72b into the engaging holes 33 formed in the circuit board 30. Then, the circuit board 30 to which the driver device 70 is connected and the light-conductive plate 20 having the front panel 10 are assembled together, in the same manner as in the first embodiment. The pointer shaft 74c extends through the through-hole 13 formed on the front panel 10, and the pointer is connected to the pointer 50.

Since, in the third embodiment, all the components constituting the driver device 70 are positioned at the rear side of the circuit board 30, there is a sufficient space available for mounting other necessary components on the front surface of the circuit board 30. The stator 70c which requires soldering is first connected to the circuit board 30, and then, after the heat generated in the reflow-soldering process is dissipated, the casing 70a that contains the heat-sensitive resin gears is fastened to the circuit board 30. Therefore, the resin gears are not damaged by the heat generated in the soldering process. Though the rotor 70d is positioned at the rear side of the circuit board 30 in the third embodiment, it is also possible to position the rotor 70d at the front side of the circuit board 30 as in the second embodiment.

The soldering is performed under the reflow-process in the embodiments described above, it is also possible to use a flow-soldering process. The instrument panel according to the present invention is not limited for use in automobiles, but it may be used for motorcycles and other equipments.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An instrument panel comprising:

a scale plate having numerals and scales thereon;

a pointer rotatable at a front side of the scale plate, the pointer being connected to a pointer shaft;

a driver device for rotating the pointer shaft, the driver device comprising: a stepping motor composed of a stator including a field coil wound around a yoke and a rotor having a magnet; and a reduction gear train having a plurality of synthetic resin gears operably connected between the rotor of the stepping motor and the pointer shaft; and a circuit board, for electrically connecting the field coil, positioned at a rear side of the scale plate to form an inner space between the scale plate and the circuit board, wherein:

the field coil and the yoke are supported by the circuit board and positioned in the inner space, the field coil being electrically connected to the circuit board by soldering; and the reduction gear train is positioned at a rear side of the circuit board.

2. The instrument panel as in claim 1, wherein:

the rotor of the stepping motor is positioned at a rear side of the circuit board;

poles extend from the yoke through the circuit board and face the rotor with an air gap; and the soldering of the field coil on the circuit board is performed under a reflow-soldering or a flow-soldering process.

3. The instrument panel as in claim 1, wherein:

the rotor is positioned at a front side of the circuit board; and the soldering of the field coil on the circuit board is performed under a reflow-soldering or a flow-soldering process.

4. The instrument panel as in claim 1, further including a light-conductive plate disposed in the inner space in contact with the scale plate, the light-conductive plate having a cut-out opening, wherein:

the pointer shaft extents frontward from the driver device through the circuit board, the opening of the light-conductive plate and the scale plate; and the yoke and the field coil of the stator are positioned in the opening of the light-conductive plate.

5. The instrument panel as in claim 1, further including a light source for illuminating either the pointer or the scale plate, or both, the light source being supported on the circuit board and electrically connected thereto.

6. An instrument panel comprising:

a scale plate having numerals and scales thereon;

a pointer rotatable at a front side of the scale plate, the pointer being connected to a pointer shaft;

a driver device for rotating the pointer shaft, the driver device comprising: a stepping motor composed of a stator including a field coil wound around a yoke and a rotor having a magnet; and a reduction gear train having a plurality of synthetic resin gears operably connected between the rotor of the stepping motor and the pointer shaft; and a circuit board, for electrically connecting the field coil, positioned at a rear side of the scale plate to form an inner space between the scale plate and the circuit board, wherein:

all components of the driver device are disposed at a rear side of the circuit board and supported by the circuit board; and terminals of the field coil are led out to a front side of the circuit board and soldered on a front surface of the circuit board.

7. The instrument panel as in claim 6, wherein:

the soldering of the terminals is performed under a reflow-soldering or a flow-soldering process.

8. The instrument panel as in claim 6, further including a light source for illuminating either the pointer or the scale plate, or both, the light source being supported on the circuit board and electrically connected thereto.

9. A method of manufacturing an instrument panel having a pointer, a motor for driving the pointer, a synthetic resin reduction gear train disposed between the pointer and the motor, and a circuit board for electrically connecting a field coil of a stator composing the motor, the method comprising:

preparing separately the reduction gear train, the circuit board, and the stator having the field coil;

supporting the stator having the field coil on a front surface of the circuit board;

soldering terminals of the field coil on the front surface of the circuit board;

cooling the circuit board for dissipating heat generated by soldering; and connecting the reduction gear train to a rear surface of the circuit board.

10. A method of manufacturing an instrument panel having a pointer, a motor for driving the pointer, a synthetic resin reduction gear train disposed between the pointer and the motor, and a circuit board for electrically connecting a field coil of a stator composing the motor, the method comprising:

preparing separately the reduction gear train, the circuit board, and the stator having the field coil;

supporting the stator having the field coil on a rear surface of the circuit board;

leading terminals of the field coil from the rear surface to the front surface of the circuit board;

soldering the terminals of the field coil on the front surface of the circuit board;

cooling the circuit board for dissipating heat generated by soldering; and connecting the reduction gear train to the rear surface of the circuit board.

* * * * *